United States Patent [19]

Seitz et al.

[11] Patent Number: 4,968,783
[45] Date of Patent: Nov. 6, 1990

[54] AMINO-FLUORO-S-TRIAZINE DISAZO DYES OF THE H-ACID SERIES

[75] Inventors: Karl Seitz, Oberwil; Gert Hegar, Schönenbuch, both of Switzerland

[73] Assignee: Ciba-Geigy Corporation, Ardsley, N.Y.

[21] Appl. No.: 299,164

[22] Filed: Jan. 19, 1989

Related U.S. Application Data

[63] Continuation of Ser. No. 767,941, Aug. 21, 1985, abandoned, which is a continuation of Ser. No. 607,365, May 7, 1984, abandoned, which is a continuation of Ser. No. 498,674, May 31, 1983, abandoned, which is a continuation of Ser. No. 193,239, Oct. 2, 1990, abandoned, which is a continuation of Ser. No. 48,192, Jun. 13, 1979, abandoned.

[30] Foreign Application Priority Data

Jun. 19, 1978 [CH] Switzerland ............ 6646/78
May 16, 1979 [CH] Switzerland ............ 4552/79

[51] Int. Cl.$^5$ .................. C09B 62/09; D06P 1/382; D06P 3/24; D06P 3/66
[52] U.S. Cl. ................... 534/637; 534/598; 534/827; 534/887
[58] Field of Search ................ 534/625, 637

[56] References Cited

U.S. PATENT DOCUMENTS

| | | | |
|---|---|---|---|
| 3,190,872 | 6/1965 | Obsterlein et al. ............ | 534/638 |
| 3,663,526 | 5/1972 | Obsterlein et al. ............ | 534/638 |
| 3,711,460 | 1/1973 | Schundehutte ............... | 534/638 |
| 3,966,705 | 6/1976 | Obsterlein et al. ............ | 534/638 |
| 4,115,378 | 9/1978 | Bien et al. .................... | 260/146 T |
| 4,261,889 | 4/1981 | Seiler et al. .................. | 260/153 |

FOREIGN PATENT DOCUMENTS

| | | | |
|---|---|---|---|
| 2516557 | 10/1975 | Fed. Rep. of Germany ...... | 534/638 |
| 2705681 | 8/1977 | Fed. Rep. of Germany ...... | 534/638 |
| 872313 | 7/1961 | United Kingdom . | |

OTHER PUBLICATIONS

Harms, "Organofluorine Chemicals and Their Industrial Applications", p. 202, (1979).
Morrison & Boyd Organic Chemistry, pp. 113–114.
Journal of the American Chem. Society, 81, 3769–3770, (1959).

*Primary Examiner*—Floyd D. Higel
*Attorney, Agent, or Firm*—Edward McC. Roberts; George R. Dohmann

[57] ABSTRACT

Reactive dyes useful for dyeing natural and synthetic fibers of the formula

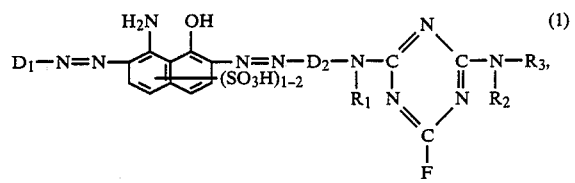

in which $D_1$ is a benzene or naphthalene radical, which can be substituted, $D_2$ is a benzene radical, which can be substituted, $R_1$ is hydrogen or $C_{1-4}$-alkyl, the bridge member —N($R_1$)— is bonded to a ring carbon atom of $D_2$, $R_2$ is hydrogen or $C_{1-4}$-alkyl, which can be substituted, and $R_3$ is hydrogen or substituted or unsubstituted alkyl, cycloalkyl, aralkyl or aryl.

2 Claims, No Drawings

AMINO-FLUORO-S-TRIAZINE DISAZO DYES OF THE H-ACID SERIES

This application is a continuation of 06/767,941, filed 8/21/85, abandoned, which is a continuation of 06/607,365, filed 5/7/84, abandoned, which is a continuation of 06/498,674, filed 5/31/83, abanonded, which is a continuation of 06/193,239, filed 10/2/80, abandoned, which is a continuation of 06/048,192, filed 6/13/79, abandoned.

The invention relates to reactive dyes of the formula

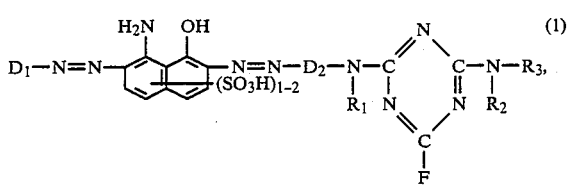

in which $D_1$ is a benzene or naphthalene radical, which can be substituted, $D_2$ is a benzene radical, which can be substituted, $R_1$ is hydrogen or $C_{1-4}$-alkyl, the bridge member —$N(R_1)$— is bonded to a ring carbon atom of $D_2$, $R_2$ is hydrogen or $C_{1-4}$-alkyl, which can be substituted, and $R_3$ is hydrogen or substituted or unsubstituted alkyl, cycloalkyl, aralkyl or aryl.

The radicals $D_1$ and $D_2$ can contain the substituents customary in azo dyes. Examples of suitable further substituents are the following: alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino, propionylamino and benzoylamino, carbamoyl, sulfamoyl, amino groups, such as —$NH_2$, methylamino and ethylamino, the ureido, hydroxyl and carboxyl group, halogen, such as fluorine, chlorine and bromine, and the sulfonic acid group.

The radicals $D_1$ and $D_2$ contain in particular one or more sulfonic acid groups as further substituents. $C_{1-4}$-alkyl $R_1$ can be: methyl, ethyl, propyl, isopropyl, butyl, isobutyl, sec.-butyl and tert.-butyl. An alkyl radical $R_2$ can be substituted, for example by chlorine, hydroxyl, cyano, methoxy, carboxyl and sulfo. Examples of $R_2$ are: methyl, ethyl, propyl, isopropyl, butyl, isobutyl, sec.-butyl, tert.-butyl, β-hydroxyethyl, β-chloroethyl, β-cyanoethyl, cyanomethyl, γ-cyanopropyl, β-methoxyethyl, β-carboxyethyl, sulfomethyl and β-sulfoethyl. Examples of $R_3$ are: hydrogen, the same substituted and unsubstituted alkyl radicals which have been mentioned above for $R_2$, methoxypropyl, ethoxyethyl, ethyoxypropyl and methoxybutyl, cyclohexyl, benzyl, 4-sulfobenzyl, 4-methylbenzyl, phenethyl and in particular phenyl, which can be substituted by $C_{1-4}$-alkyl, $C_{1-4}$-alkoxy, acetylamino, ureido, carboxyl, halogen, sulfo, sulfomethyl, trifluoromethyl, sulfamoyl and carbamoyl, or naphthyl, which can be substituted by sulfo; $R_2$ and $R_3$ can also be closed to form a six-membered N-heterocyclic ring, which can contain a further hetero-atom, such as nitrogen, oxygen and sulfur. Examples of the amino radical —$NR_2R_3$ in formula (1) are: —$NH_2$, methylamino, ethylamino, propylamino, isopropylamino, butylamino, β-methoxyethylamino, γ-methoxypropylamino, N,N-dimethylamino, N,N-diethylamino, N-methyl-N-phenylamino, N-ethyl-N-phenylamino, β-chloroethylamino, β-hydroxyethylamino, γ-hydroxypropylamino, benzylamino, cyclohexylamino, morpholino, piperidino, piperazino and, in particular, aromatic amino groups, such as phenylamino, toluidino, chloroanilino, anisidino, phenetidino, 2-, 3-and 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfonaphth-1-yl-amino, 3,6-disulfonaphth-1-yl-amino, 3,6,8-trisulfonaphth-1-yl-amino and 4,6,8-trisulfonaphth-1-yl-amino.

The disazo dyes of the formula (1) are fibre-reactive since they contain a detachable fluorine atom in the s-triazine radical.

Fibre-reactive compounds are to be understood as meaning those which are able to react with the hydroxyl groups of cellulose or with the amino groups of natural or synthetic polyamides with the formation of covalent chemical bonds.

The radical $D_1$ does not contain a reactive radical.

Preferred reactive dyes are those of the formula

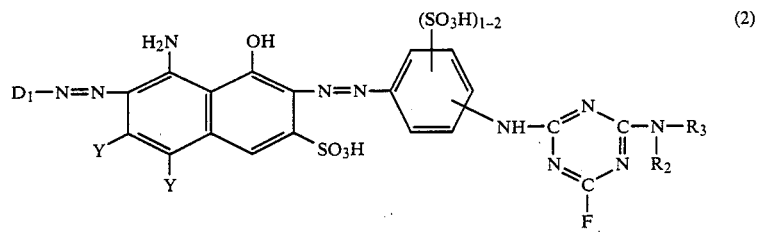

in which one Y is hydrogen and the other Y is sulfo and $D_1$, $R_2$ and $R_3$ are as defined under formula (1).

Preferred reactive dyes are especially those of the formula (2) in which $D_1$ is a benzene radical, which can be substituted by sulfo, methoxy and chlorine, or a naphthalene radical, which can be substituted by sulfo and nitro, $R_2$ is hydrogen, methyl or ethyl and $R_3$ is hydrogen, ethyl, β-hydroxyethyl, butyl, phenyl, which can be substituted by methyl, methoxy, ethoxy, chlorine, acetylamino, ureido, carboxyl and sulfo, or naphthyl, which can be substituted by sulfo, or in which the amino group —$NR_2R_3$ is the morpholino radical.

Particularly preferred reactive dyes are those of the formula

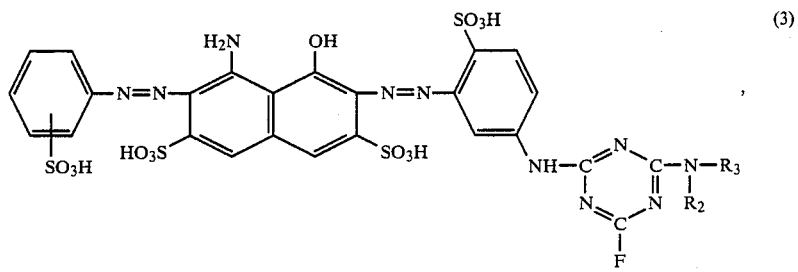

(3)

in which $R_2$ is hydrogen, methyl or ethyl and $R_3$ is hydrogen or phenyl, which can be substituted by methyl, methoxy, chlorine and sulfo.

A valuable reactive dye of the category defined by formula (3) is the reactive dye of the formula

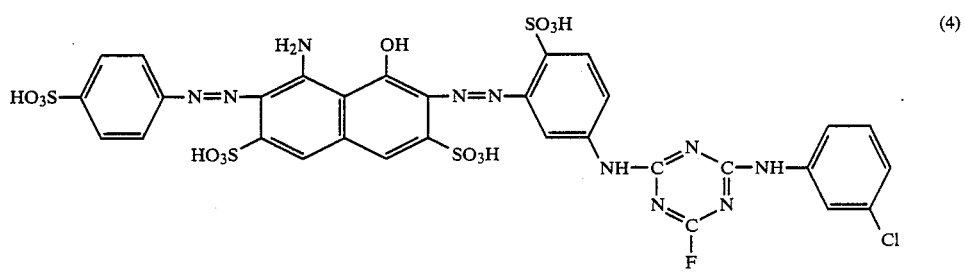

(4)

The preparation of the reactive dyes of the formula (1) comprises diazotisation, coupling and condensation reactions using a coupling component of the formula

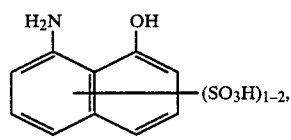

(5)

a diazo component of the formula $D_1$—$NH_2$ (6), a further diazo component of the formula

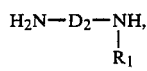

(7)

2,4,6-trifluoro-s-triazine of the formula

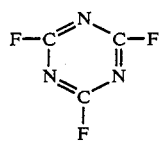

(8)

and an amino compound of the formula

(9)

the said reactions being carried out in any order.

In a preferred embodiment the coupling component of the formula (5) which is used is a compound of the formula

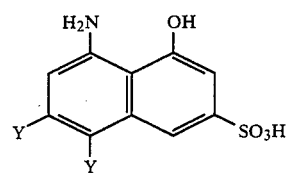

(10)

in which one Y is hydrogen and the other Y is sulfo, and the diazo component of the formula (7) which is used is a compound of the formula

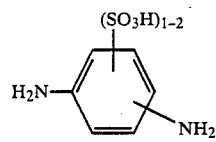

(11)

The starting materials used are in particular compounds of the formulae (6) and (9) in which $D_1$ is a benzene radical, which can be substituted by sulfo, methoxy and chlorine, or a naphthalene radical, which can be substituted by sulfo and nitro, $R_2$ is hydrogen, methyl or ethyl and $R_3$ is hydrogen, ethyl, β-hydroxyethyl, butyl, phenyl, which can be substituted by methyl, methoxy, ethoxy, chlorine, acetylamino, ureido, carboxyl and sulfo, or naphthyl, which can be substituted by sulfo, or in which the amino group —$NR_2R_3$ is the morpholino radical.

The preferred reactive dyes of the formula (3) are obtained by diazotisation, coupling and condensation reactions using a diazo component of the formula

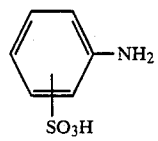 (12)

1-amino-8-hydroxynaphthalene-3,6-disulfonic acid, 1,3-diaminobenzene-4-sulfonic acid, cyanuric fluoride and an amino compound of the formula (9), in which $R_2$ and $R_3$ are as defined under formula (3), the said reactions being carried out in any order.

Since the individual process steps indicated above, i.e. diazotisation, coupling and condensation, can be carried out in different orders, and, if desired, some process steps can also be carried out at the same time, various process variants are possible. The starting materials to be used for each partial reaction can be seen from formula (1). In general, the reaction is carried out in successive steps and the order in which the simple reactions between the individual reactants of the formulae (5) to (9) are carried out can be freely chosen.

Important process variants comprise 1. reacting a coupling component of the formula (5) with diazotised diazo components of the formulae (6) and (7) to give a disazo compound, subjecting the latter to a condensation reaction with 2,4,6-trifluoro-s-triazine of the formula (8) and subjecting the primary condensation product to a condensation reaction with an amino compound of the formula (9).

The last two reaction steps can also be carried out in a different order, by first subjecting the 2,4,6-trifluoro-s-triazine to a condensation reaction with an amino compound of the formula (9) and subjecting the resulting primary condensation product to a condensation reaction with the abovementioned disazo compound.

The procedure employed for the preparation of the abovementioned disazo compound is advantageously first to couple a diazotised diazo component of the formula (6) with a coupling component of the formula (5) and then to couple the resulting monoazo compound with a diazotised diazo component of the formula (7). 2. diazotising a diazo component of the formula (6) and coupling the resulting compound with a coupling component of the formula (5) and also subjecting 2,4,6-trifluoro-s-triazine of the formula (8) to a condensation reaction with an amino compound of the formula (9), subjecting the primary condensation product to a condensation reaction with a diazo component of the formula (7) and diazotising the resulting secondary condensation product and coupling the resulting product with the monoazo compound prepared initially.

The preferred procedure for the preparation of the reactive dye of the formula (4) comprises diazotising sulfanilic acid and 1,3-phenylenediamine-4-sulfonic acid and coupling the reaction product with 1-amino-8-hydroxynaphthalene-3,6-disulfonic acid, subjecting the resulting intermediate of the formula to a condensation reaction with cyanuric fluoride and subjecting the primary condensation product to a condensation reaction with m-chloroaniline.

The diazotisation of the diazo components is as a rule effected by the action of nitrous acid in aqueous-mineral acid solution at low temperature.

The coupling of the diazo component of the formula (6) with the coupling component of the formula (5) in the ortho-position relative to the $H_2N$ group is effected in strongly acid solution, at pH values of 1 to 2; the coupling of the diazo component of the formula (7) with the coupling component of the formula (5) in the orthoposition relative to the HO group is effected in the weakly acid or neutral to weakly alkaline range, at pH values between 6.5 and 8.

In general, it is necessary first to carry out the coupling reaction in acid solution. In some cases, for the coupling reactions in which a diaminobenzenesulfonic acid is used as the diazo component of the formula (7), it is advantageous not to use this as itself, but, instead of this, to use an amino-acylamino-benzenesulfonic acid, for example 5-acetylaminoaniline-2-sulfonic acid, from which the acetyl group is detached by saponification after the coupling reaction has gone to completion, before carrying out the further condensation reaction. Furthermore, it is also possible to use a nitro-amino compound, for example 5-nitroaniline-2-sulfonic acid, as the diazo component of the formula (7) and, after the coupling reaction has taken place, to reduce the nitro group to the amino group with sodium sulfide or sodium hydrosulfide.

The condensation reactions of 2,4,6-trifluoro-s-triazine of the formula (8) with the diazo components of the formula (7) and the amino compounds of the formula (9) are preferably effected in aqueous solution or suspension, at low temperature and at a weakly acid or neutral to weakly alkaline pH value, so that at least one fluorine atom still remains as a detachable radical in the finished reactive dye of the formula (1). Advantageously, the hydrogen fluoride liberated during the condensation reaction is neutralised continuously by adding aqueous alkali metal hydroxides, alkali metal carbonates or alkali metal bicarbonates.

The preparation of the diazo intermediates is not described in all cases in the illustrative examples which follow, but is obvious from what has been stated above.

Examples of starting compounds for the preparation of the reactive dyes of the formula (1) are:

(a) Coupling components of the formula (5)

1-amino-8-hydroxynaphthalene-3,6-disulfonic acid (H-acid), 1-amino-8-hydroxynaphthalene-4,6-disulfonic acid (K-acid) and 1-amino-8-hydroxynaphthalene-4-sulfonic acid.

(b) Diazo components of the formula (6)

aniline, o-, m- and p-toluidines, o-, m- and p-anisidines, o-, m- and p-chloroanilines, 2,5-dichloroaniline, α- and β-naphthylamine, 2,5-dimethylaniline, 5-nitro-2-

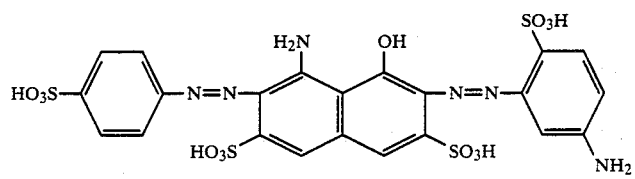 (13)

aminoanisole, 4-amino-diphenyl, aniline-2-, -3- and -4-carboxylic acids, 2-aminodiphenyl ether, 2-, 3- or 4-aminobenzenesulfonamide or 2-, 3- or 4-aminobenzenesulfonic acid mono-methyl-or -ethyl-amides or 2-, 3- or 4-aminobenzenesulfonic acid dimethyl- or diethyl-amides, aniline-2-, -3- and -4-sulfonic acid, aniline-2,5-disulfonic acid, 2,4-dimethylaniline-6-sulfonic acid, 4-chloro-5-methylaniline-2-sulfonic acid, aniline-2,4-disulfonic acid, aniline-3,5-disulfonic acid, 2-amino-4- or -5-sulfobenzoic acid, 2-methylaniline-3,5-disulfonic acid, 2-methylaniline-5-sulfonic acid, 2-methoxyaniline-3,5-disulfonic acid, 2-chloroaniline-4-sulfonic acid, 2,3-dimethylaniline-4,6-disulfonic acid, 2,5-dimethylaniline-4,6-disulfonic acid, 5-chloro-4-methylaniline-2-sulfonic acid, 3-acetylaminoaniline-6-sulfonic acid, 4-acetylaminoaniline-2-sulfonic acid, 4-chloroaniline-2-sulfonic acid, 3,4-dichloroaniline-6-sulfonic acid, 4-methylaniline-2-sulfonic acid, 3-methylaniline-6-sulfonic acid, 2,4-dimethoxyaniline-6-sulfonic acid, 4-methoxyaniline-2-sulfonic acid, 5-methoxyaniline-2-sulfonic acid, 2,5-dichloroaniline-4-sulfonic acid, 2,4-dimethylaniline-5-sulfonic acid, 2-methoxyaniline-5-sulfonic acid, 2-methylaniline-4-sulfonic acid, 4-nitroaniline-2-sulfonic acid, 4-ethoxyaniline-2-sulfonic acid, 4-ethylaniline-2-sulfonic acid, 4-acetylaminoaniline, 4-ethoxyaniline-3-sulfonic acid, 3,4-dichloroaniline, o-, m- and p-nitroaniline, m- and p-aminoacetanilide, 4-amino-2-acetylaminotoluene-5-sulfonic acid, 4-methoxyaniline-3-sulfonic acid, 1-aminonaphthalene-2-, -4-, -5-, -6-, -7- or -8-sulfonic acid, 2-aminonaphthalene-1-, -5- or -6-sulfonic acid, 1-aminonaphthalene-3,6-or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-amino-2-hydroxy-6-nitronaphthalene-4-sulfonic acid, 2-amino-1-hydroxynaphthalene-4,8-disulfonic acid, 1-amino-3-acetylaminobenzene (saponified), 1-amino-3-acetylaminobenzene-5-or -6-sulfonic acid (saponified), 1-amino-4-acetylaminobenzene-2-sulfonic acid (saponified), 1-amino-3-(N-acetyl-N-methylamino)-benzene (saponified), 3- or 4-nitroaniline (reduced), 2-methoxy-4- or -5-nitroaniline (reduced), 2-methoxy-3-nitro-5-methylaniline (reduced) and 2-methoxy-3-nitro-5-chloroaniline.

(c) Diazo components of the formula (7)

1,3- and 1,4-diaminobenzene, 1,3- and 1,4-diaminoanisole, 1,3- and 1,4-diaminotoluene, 1,3-diamino-4-chlorobenzene, 1,3-diamino-4-ethylbenzene, 1,3-diamino-4-ethoxybenzene, 1,3-diaminobenzene-4-sulfonic acid, 1,4-diaminobenzene-2-sulfonic acid, 1,4-diaminobenzene-2,5-disulfonic acid, 1,4-diaminobenzene-2,6-disulfonic acid and 1,3-diaminobenzene-4,6-disulfonic acid.

(d) 2,4,6-Trifluoro-s-triazine of the formula (8) (cyanuric fluoride)

(e) Amino compounds of the formula (9)

ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitroaniline, 2-nitro-4-methylaniline, 3-nitro-4-methylaniline, o-, m- and p-anisidine, o-, m- and p-phenetidine, 2-methoxy-5-methylaniline, 2-ethoxy-5-methoxyaniline, 4-bromoaniline, 3-aminobenzamid, 4-aminophenylsulfamide, 3-trifluoromethylaniline, 3- and 4-aminophenylurea, 1-naphthylamine, 2-naphthylamine, 2-amino-1-hydroxy-naphthalene, 1-amino-4-hydroxy-naphthalene, 1-amino-8-hydroxy-naphthalene, 1-amino-2-hydroxy-naphthalene, 1-amino-7-hydroxy-naphthalene, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxy-benzene-3-sulfonic acid, 1-amino-2-carboxybenzene-5-sulfonic acid, 1-amino-5-carboxy-benzene-2-sulfonic acid, 1-naphthylamine-2-, -3-, -4-, -5-, -6-, -7- and -8-sulfonic acid, 2-naphthylamine-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- and -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8-and -4,6,8-trisulfonic acid, 2-, 3- and 4-aminopyridine, 2-aminobenzthiazole, 5-, 6- and 8-aminoquinoline, 2-aminopyrimidine, morpholine, piperidine and piperazine.

The reactive dyes of the formula (1) can be isolated and processed to usable, dry dye preparations. Isolation is preferably effected at temperatures which are as low as possible, by salting out and filtering. If desired, the dyes filtered off can be dried after adding diluents and/or buffers, for example after adding a mixture of equal parts of monosodium phosphate and disodium phosphate; preferably, drying is carried out at temperatures which are not too high and under reduced pressure. In certain cases the dry preparations according to the invention can be prepared direct, i.e. without intermediate isolation of the dyes, by spray-drying the entire mixture in which they were prepared.

The reactive dyes of the formula (1) are novel. They are distinguished by high reactivity and give dyeings which have good wet fastness properties and good fastness to light. Particular mention should be made of the fact that the dyes have good solubility and electrolyte solubility coupled with good uptake characteristics and good fixing of the dye, and that the portions not fixed can be removed easily. The dyeings are dischargeable.

The reactive dyes of the formula (1) are suitable for dyeing and printing very diverse materials, such as silk, leather, wool, high molecular weight polyamide fibres and high molecular weight polyurethanes, but especially cellulose-containing materials of fibrous structure, such as linen, cellulose, regenerated cellulose and in particular cotton. They are suitable both for the exhaustion process and for dyeing by the pad dyeing method, according to which the goods are impregnated with aqueous dye solutions, which can also contain salts, and the dyes are fixed after an alkali treatment or in the presence of alkali, if necessary with the action of heat.

They are also suitable for printing, especially on cotton, but are likewise also suitable for printing nitrogen-containing fibres, for example wool, silk or mixed fabrics containing wool.

It is advisable to subject the dyeings and prints to thorough rinsing with cold and hot water, if necessary with the addition of an agent which acts as a dispersing agent and promotes the diffusion of the non-fixed portions.

In the following examples parts are by weight and the temperatures are given in degrees Centigrade.

EXAMPLE 1

A neutral solution of 70.2 parts of the disazo dye of the formula

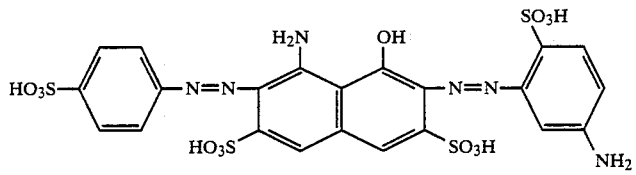

in 500 parts of water is cooled to 0° to 5° C. by adding 300 parts of ice. 10 parts of cyanuric fluoride are allowed to run in the course of 5 to 10 minutes, with vigorous stirring, and at the same time the pH of the reaction mixture is kept between 6 and 7 by the dropwise addition of 2N sodium hydroxide solution. After the acylation has gone to completion, 10.7 parts of o-toluidine are added to the solution of the difluorotriazine dye and the reaction mixture is warmed to 30° to 35° C. and the pH is kept between 7 and 8 by dropwise addition of 2N sodium hydroxide solution. After the reaction has gone to completion, 5 parts of disodium hydrogen phosphate are added to the solution of the monofluorotriazine dye and the solution is evaporated to dryness in a rotary evaporator at 40° to 45° C.

The dye thus obtained dyes cotton in navy blue shades.

Similar dyes, which also dye cotton in navy blue shades, are obtained when the above example is repeated using equivalent amounts of the amines listed below in place of o-toluidine.

| Example | Amines |
|---|---|
| 2 | m-Toluidine |
| 3 | p-Toluidine |
| 4 | 2,4-Dimethylaniline |
| 5 | 2,5-Dimethylaniline |
| 6 | 2,6-Dimethylaniline |
| 7 | Ethanolamine |
| 8 | Aniline |
| 9 | N-Methylaniline |
| 10 | N-Ethylaniline |
| 11 | m-Chloroaniline |
| 12 | p-Chloroaniline |
| 13 | Acetyl-m-phenylenediamine |
| 14 | Acetyl-p-phenylenediamine |
| 15 | o-Anisidine |
| 16 | p-Anisidine |
| 17 | 4-Aminophenyl-urea |
| 18 | 3-Aminophenyl-urea |
| 19 | p-Aminobenzoic acid |
| 20 | Metanilic acid |
| 21 | 2-Aminonaphthalene-6-sulfonic acid |
| 22 | Ammonia |
| 23 | m-Anisidine |
| 24 | 4-Ethoxyaniline |
| 25 | Morpholine |
| 26 | Taurine |

Further dyes, which dye cotton in the shades listed in column III, are obtained when the amino group-containing disazo dyes listed in column I are reacted with cyanuric fluoride and the amines listed in column II.

| I | II | III |
|---|---|---|
| (disazo dye structure) | Aniline | greenish-tinged blue |
| (disazo dye structure) | 3-Aminotoluene | greenish-tinged blue |

-continued

| I | II | III |
|---|---|---|
| [structure: 4-methoxy-2-sulfophenyl azo / naphthalene core with H2N, OH, HO3S, SO3H / 5-amino-2-sulfophenyl azo] | n-Butylamine | greenish-tinged blue |
| [structure: 2-chloro-4-sulfophenyl azo / naphthalene core / 5-amino-2-sulfophenyl azo] | Aniline-3-sulfonic acid | greenish-tinged blue |
| [structure: 2,5-disulfophenyl azo / naphthalene core with additional HO3S / 5-amino-2-sulfophenyl azo] | 4-Aminoanisole | blue |
| [structure: 5,8-disulfonaphthyl azo / naphthalene core / 5-amino-2-sulfophenyl azo] | 3-Chloroaniline | strongly greenish-tinged blue |
| [structure: 5,8-disulfonaphthyl azo / naphthalene core / 4-aminophenyl azo (2-SO3H)] | Ethylamine | blue-green |
| [structure: 1,5-disulfonaphthyl azo / naphthalene core / 5-amino-2-sulfophenyl azo] | N-Methylaniline | strongly greenish-tinged blue |
| [structure: 1,4,6-trisulfonaphthyl azo / naphthalene core / 5-amino-2-sulfophenyl azo] | 3-Aminotoluene | strongly greenish-tinged blue |
| [structure: 7-nitro-1,4-disulfonaphthyl azo / naphthalene core / 5-amino-2-sulfophenyl azo] | Metanilic acid | strongly greenish-tinged blue |

-continued

| I | II | III |
|---|---|---|
| (structure: HO₃S—C₆H₄—N=N— naphthalene(H₂N, OH, SO₃H)—N=N—C₆H₃(SO₃H)(NH₂)(SO₃H)) | Ammonia | blue |

EXAMPLE 2

A neutral solution of 17.3 parts of orthanilic acid in 200 parts of water is cooled to 0° C. by adding 250 parts of ice. 9 parts of cyanuric fluoride are allowed to run in the course of 10 minutes, with vigorous stirring, and the pH is kept between 6 and 7 by the dropwise addition of 2N sodium hydroxide solution. When no further unchanged orthanilic acid is detectable, a neutral solution of 18.8 parts of m-phenylenediaminesulfonic acid in 50 parts of water is added to the solution of the primary condensation product, the temperature is allowed to rise to 20° to 25° C. and the pH of the reaction mixture is kept between 6.5 and 7.0. After the reaction has gone to completion, the secondary condensation product is salted out by adding 15% by volume of potassium chloride and filtered off.

25 parts of 4N sodium nitrite solution are added to a neutral suspension of 45.6 parts of the secondary condensation product described above in 150 parts of water and the mixture is cooled to 0° to 5° C. with ice. 30 parts of 10N hydrochloric acid are added and after several hours the excess nitrite is destroyed with sulfamic acid.

The yellow suspension of the diazo compound which is thus obtained is then poured into an ice-cold neutral solution of 50.3 parts of the dye "sulfanilic acid $\xrightarrow{acid}$ H-acid"

in 150 parts of water, to which 30 parts of sodium bicarbonate have also been added prior to the coupling reaction.

A clear solution forms (volume about 750 parts) and the dye formed is salted out from this by adding 10% by volume of a mixture of sodium chloride and potassium chloride in a ratio of 1:1. After filtering, the dye paste is mixed with a concentrated aqueous solution of 5 parts of disodium hydrogen phosphate and dried in vacuo at 50° C.

The dye thus obtained dyes cotton in navy blue shades.

EXAMPLE 3

10 parts of cyanuric fluoride are added dropwise in the course of about 10 minutes to an ice-cold, neutral solution of 17.3 parts of orthanilic acid in 400 parts of water, the pH value of the reaction mixture being kept between 6 and 7 by adding 1N sodium hydroxide solution at the same time.

The primary condensation product thus obtained is then poured into a neutral solution of 70.2 parts of the disazo dye of the formula

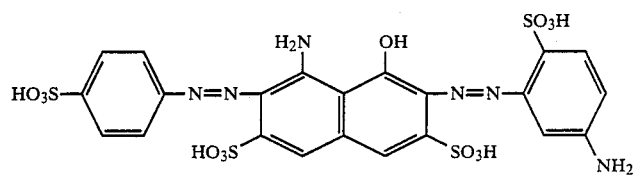

in 500 parts of water and the reaction mixture is warmed to 30° to 35° C. and the pH value is kept between 7 and 8 by the dropwise addition of 1N sodium hydroxide solution.

After the acylation has gone to completion, 5 parts of disodium hydrogen phosphate are added to the solution of the monofluorotriazine dye and the solution is evaporated to dryness in a rotary evaporator at 40° to 45° C. The dye thus obtained dyes cotton in navy blue shades.

When the procedure of the above example is repeated except that 18.72 parts of 4-aminotoluene-3-sulfonic acid are used in place of orthanilic acid, a dye is obtained which also dyes cotton in navy blue shades.

Dyeing instructions I 2 parts of the dye obtained according to Example 1 are dissolved in 100 parts of water with the addition of 0.5 part of sodium m-nitrobenzenesulfonate. A cotton fabric is impregnated with the resulting solution so that the liquor pick-up is 75% and is then dried.

The fabric is then impregnated with a solution, at 20°, which contains, per litre, 5 grams of sodium hydroxide and 300 grams of sodium chloride, and squeezed off to a liquor pick-up of 75% and the dyeing is steamed for 30 seconds at 100° to 101°, rinsed, soaped for a quarter of an hour in a 0.3% boiling solution of a non-ionic detergent, rinsed and dried.

Dyeing instructions II 2 parts of the dye obtained according to Example 1 are dissolved in 100 parts of water.

The solution is added to 1,900 parts of cold water, 60 parts of sodium chloride are added and 100 parts of a cotton fabric are put into this dyebath.

The temperature is raised to 40° and after 30 minutes 4 parts by volume of 30% sodium hydroxide solution, 10 parts of calcined sodium carbonate and a further 60 parts of sodium chloride are added. The temperature is maintained at 40° for 30 minutes and the dyeing is then rinsed and soaped for 15 minutes in a 0.3% boiling solution of a non-ionic detergent, rinsed and dried.

What is claimed is:
1. A reactive dye of the formula
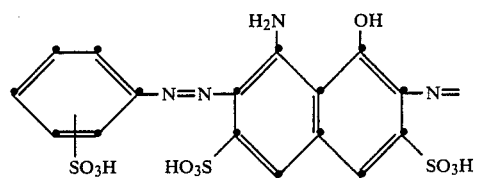
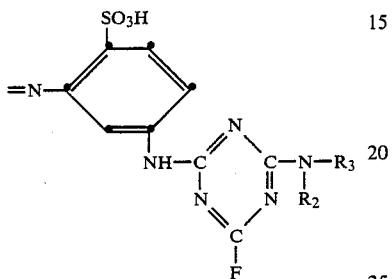
in which $R_2$ is hydrogen, and $R_3$ is phenyl, which is unsubstituted or substituted by chlorine or sulfo.
2. The reactive dye according to claim 1 of the formula
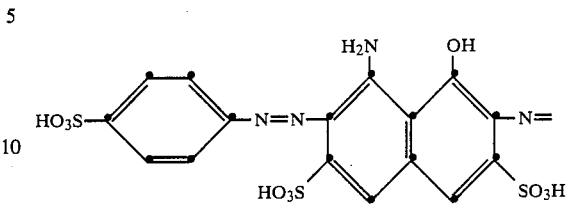
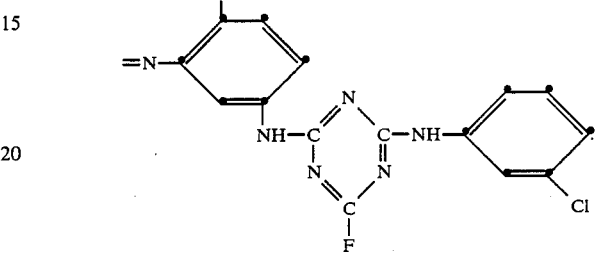
* * * * *

UNITED STATES PATENT AND TRADEMARK OFFICE
CERTIFICATE OF CORRECTION

PATENT NO. : 4,968,783

DATED : 11/6/90

INVENTOR(S) : Seitz et al.

It is certified that error appears in the above-identified patent and that said Letters Patent is hereby corrected as shown below:

ON TITLE PAGE:

63 line 5 should read:

continuation of Ser. No. 193,239, Oct. 2, 1980, aban-

Signed and Sealed this

Second Day of June, 1992

Attest:

DOUGLAS B. COMER

*Attesting Officer*  *Acting Commissioner of Patents and Trademarks*